US009264584B2

(12) United States Patent
Dhillon

(10) Patent No.: US 9,264,584 B2
(45) Date of Patent: Feb. 16, 2016

(54) VIDEO SYNCHRONIZATION

(71) Applicant: TATA CONSULTANCY SERVICES LIMITED, Mumbai, Maharashtra (IN)

(72) Inventor: Jyoti Dhillon, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 81 days.

(21) Appl. No.: 13/775,867

(22) Filed: Feb. 25, 2013

(65) Prior Publication Data

US 2014/0078395 A1 Mar. 20, 2014

(30) Foreign Application Priority Data

Sep. 19, 2012 (IN) .......................... 2730/MUM/2012

(51) Int. Cl.
 *H04N 5/04* (2006.01)
 *G11B 27/031* (2006.01)
 *G11B 27/10* (2006.01)
 *G11B 27/28* (2006.01)

(52) U.S. Cl.
 CPC ................ *H04N 5/04* (2013.01); *G11B 27/031* (2013.01); *G11B 27/10* (2013.01); *G11B 27/28* (2013.01)

(58) Field of Classification Search
 None
 See application file for complete search history.

(56) References Cited

U.S. PATENT DOCUMENTS

| 6,373,960 B1* | 4/2002 | Conover et al. ............... 382/100 |
| 2007/0025615 A1* | 2/2007 | Zhou et al. .................... 382/173 |
| 2007/0285579 A1* | 12/2007 | Hirai et al. ..................... 348/700 |
| 2008/0154908 A1* | 6/2008 | Datar et al. ...................... 707/10 |
| 2009/0219986 A1* | 9/2009 | Pan et al. ................. 375/240.01 |
| 2010/0061587 A1 | 3/2010 | Gupta et al. |
| 2011/0122315 A1* | 5/2011 | Schweiger et al. ........... 348/500 |

OTHER PUBLICATIONS

Yeh et al.: "Video Copy Detection by Fast Sequence Matching"; CIVR '09 Proceedings of the ACM International Conference on Image and Video Retrieval, Article No. 45, ACM New York, NY, USA, 2009, ISBN: 978-1-60558-480-5 (7 pages).
Amir et al.: "IBM Research TRECVID-2003 Video Retrieval System"; IBM Paper, 2003 (18 pages).

* cited by examiner

*Primary Examiner* — Michael Teitelbaum
(74) *Attorney, Agent, or Firm* — Hamre, Schumann, Mueller & Larson, P.C.

(57) ABSTRACT

The present subject matter discloses systems and methods for synchronizing a plurality of video files. In one implementation, the method comprises detecting a one shot boundary in each of a first video file and a second video file, determining a first reference point in the first video and a second reference point in second video based on the shot boundary detection and extracting a plurality of features associated with the reference points. The method further comprises comparing each of the plurality of corresponding features extracted from the reference points in a log-polar domain based in part on normalized cross correlation, computing a matching index, indicative of the extent of match between the extracted features, and generating a notification indicating the synchronization of the first video file and the second video file if the matching index is determined to be greater than a pre-defined matching threshold.

10 Claims, 2 Drawing Sheets

VIDEO SYNCHRONIZATION

The present subject matter is related, in general to video processing and, in particular, but not exclusively to a method and system for synchronizing a plurality of video files.

BACKGROUND

The use of digital video has grown dramatically in recent times. Digital video applications include video-conferencing, video-on-demand, digital television, digital cinema, distance learning, entertainment, surveillance, advertising and many more. One of the popular applications of digital video is watching movie clips recorded on a digital video disc (DVD), a blu-ray disc or downloaded over the Internet. The proliferation of digital video into more applications is encouraged by improving compression technology, better authoring and editing tools, cost effective capture and display devices, and economically available bandwidth in digital communication networks.

Digitalization of video offers many advantages for processing and distributing video and other types of information. For example, an unlimited number of copies can be produced from a single digital video signal. While the aforementioned advantage offer immense opportunities for the creators of the video to reach out to their target audiences and consumers, the ability to make copies and the ease by which those copies can be distributed also facilitate misuse, illegal copying and distribution, usually referred to as piracy, plagiarism, and misappropriation.

The processing of digital video has given rise to various techniques, such as shot detection, also referred to as shot boundary detection; feature extraction, and video synchronization. In video processing, a shot refers to a continuous strip of motion picture film, comprising a series of frames that may run for a definite time period. The shots are generally filmed with a single camera and can be of any duration. Shot detection is the automated detection of transitions between shots in the digital video, generally for the purpose of temporal segmentation of videos. Thus shot detection techniques are used to break up a video file into temporal units, i.e. the shots. Shot detection techniques are generally used for automated indexing, content-based video retrieval, and in summarization applications which provide an efficient access to large video files. The techniques of shot detection are generally based on the transition effects between the shots. Conventionally used transition effects include hard cuts, wherein there is an instantaneous transition from one shot to the next; fades, wherein there is A fade is a gradual transition between a shot and a constant image (fade-out) or between a constant image and a shot (fade-in); dissolve, wherein there is a gradual transition from one shot to another, in which the first shot fades out and the second scene shot fades in; and wipe, in a line moves across the screen, with the new shot appearing behind the line.

Another frequently used technique in video processing is feature extraction. In feature extraction, algorithms are used to detect and isolate various desired portions or shapes or contours or histograms, collectively referred to as features, of a digital video. The feature extraction techniques usually involve various image processing techniques, such as edge detection, corner detection, blob detection, ridge detection, and scale-invariant feature transform.

SUMMARY

This summary is provided to introduce concepts related to method and system for synchronizing a plurality of video files, and the concepts are further described below in the detailed description. This summary is not intended to identify essential features of the claimed subject matter nor is it intended for use in determining or limiting the scope of the claimed subject matter.

In one implementation, a method for synchronizing a first video file and a second video file comprises detecting at least one shot boundary in each of the first video file and the second video file, determining a first reference point in the first video based on the shot boundary detection, and selecting a second reference point in second video based on the shot boundary detection. The method further comprises extracting a plurality of features associated with the first reference point and the second reference point; comparing each of the plurality of features extracted from the first reference point to the corresponding each of the plurality of features extracted from the second reference point in a log-polar domain based in part on normalized cross correlation; computing a matching index, indicative of the extent of match between the extracted features of the first reference point and the second reference point, based on the comparison; and generating a notification indicating the synchronization of the first video file and the second video file if the matching index is determined to be greater than a pre-defined matching threshold or an adaptive matching threshold.

BRIEF DESCRIPTION OF THE DRAWINGS

The present subject matter and other features and advantages thereof will become apparent and may be better understood from the following drawings. The components of the figures are not necessarily to scales, emphasis instead being placed on better illustration of the underlying principle of the subject matter. Different numeral references on figures designate corresponding elements throughout different views. In the figure(s), the left-most digit(s) of a reference number identifies the figure in which the reference number first appears. The same numbers are used throughout the drawings to reference like features and components. The detailed description is described with reference to the accompanying figure(s).

DETAILED DESCRIPTION

Figure 1:
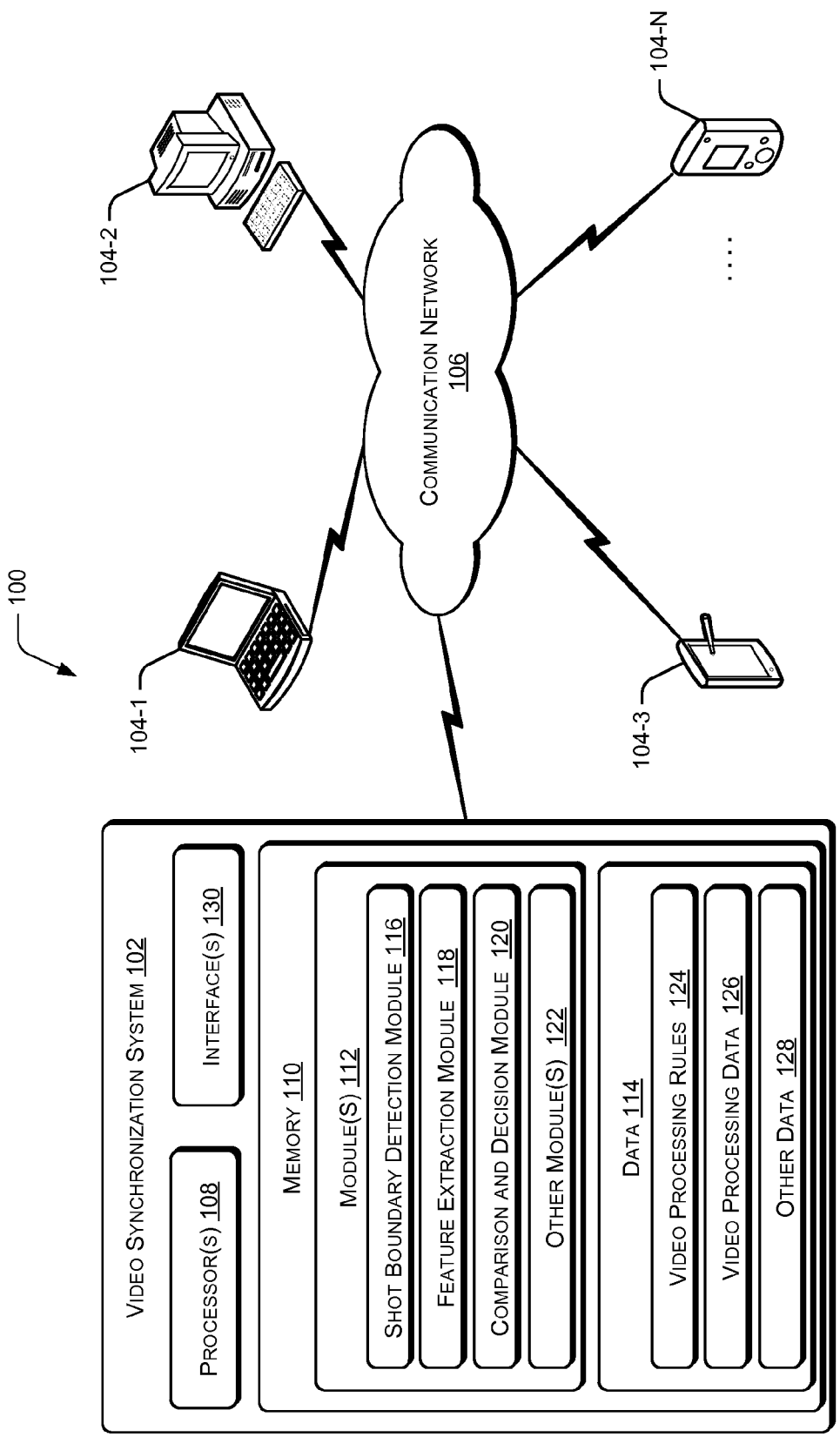
FIG. 1 illustrates the exemplary components of a video synchronization system in a network environment, in accordance with an implementation of the present subject matter.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Systems and methods for video synchronization are described therein. The systems and methods can be implemented in a variety of computing devices, such as laptops, desktops, workstations, tablet-PCs, smart phones, notebooks or portable computers, tablet computers, mainframe computers, mobile computing devices, entertainment devices, computing platforms, internet appliances and similar systems. However, a person skilled in the art will comprehend that the embodiment of the present subject matter are not limited to any particular computing system, architecture or application device, as it may be adapted to take advantage of new computing system and platform as they become accessible.

Conventional techniques of protecting copyrighted content include video watermarking. Video watermarking involve embedding cryptographic information derived from frames of digital video into the video file itself, which may be read by a digital watermarking system to determine whether a video file is a genuine copy or a pirated copy.

One of the most challenging tasks faced by conventional digital watermarking systems is geometrical attacks which are carried out by introducing geometrical transformations to the video file. The geometrical transformations may be in various forms, such as rotation, translation, scaling and rubber-sheet stretching. Another example of geometrical attack is the digital cinema attack. In the digital cinema attack, the geometrical attack is not actually performed on the video file directly. Instead, the digital cinema attack involves recording a watermarked video file being shown on the cinema screen using a camera. The result of this recording may then illegally distributed on physical media or put on the Internet for download. The quality of the recording is usually influenced by numerous factors, e.g., the position of the camera with respect to the cinema screen, the quality of the lenses in the camera, and the fact that the cinema screen itself is not perfectly flat. All these factors contribute to the complex combination of geometrical transformations being applied to the recorded video.

The geometrical transformation attacks do not actually remove the watermark from the data. Instead, the geometrical transformation attacks exploit the fact that the accuracy and success of most watermarking techniques is based on the synchronization between the watermark in the original video file and the suspect video file. If the synchronization is destroyed, the digital watermarking system can no longer correctly detect the presence of the watermark in the video file although the watermark or a major part thereof might still remain in the video file. To counter techniques of geometrical transformation, synchronization of video files is usually done. Synchronization techniques generally involve a search to detect where the watermark has been re-positioned in a watermarked video. Since, an exhaustive search is not practically feasible due to constraints of time and resources, a variety of strategies have been proposed to reduce the consumption of resources for searching and optimizing the search. Conventionally, some watermarking techniques address synchronization issues by designing the watermark, such that re-positioning is more difficult. Other techniques propose designing a pattern, known as a template, which allow the digital watermarking system to perform an informed search to discover the position of the watermark. However, the conventional synchronization techniques have limited success due to lack of accuracy, high consumption of resources and time, vulnerability to attacks and so on.

The present subject matter describes systems and methods for synchronizing a plurality of video files. In one implementation, the video files may be in encoded using various conventionally known techniques, such as (Moving Picture Experts Group) MPEG-1, H.261, MPEG-2, H.263, MPEG-4, and H.264, and saved or stored in different formats, such as flash video format (.flv), (Audio Video Interleave) AVI format (.avi), Quicktime format (.mov), MP4 Format (.mp4), Mpg format (.mpg), Windows Media Video format (.wmv), 3GP file extension (.3gp), Advances Streaming Format (.asf), Real Media format (.rm), Flash Movie format (.swf), the Real Video format. It should be appreciated by those skilled in the art that though the systems and methods for synchronizing a plurality of video files are described in the context of watermark detection, the same should not be construed as a limitation. For example, the systems and methods for synchronizing a plurality of video files may be implemented for various other purposes, such for audio-video synchronization. For the sake of explanation, the method for synchronizing a plurality of video files is explained in the context of a first video file and a second video file. However, the person skilled in the art would appreciate that the described techniques may also be applied for any number of video files, albeit modifications as known to the person skilled in the art.

In one implementation, the method for synchronizing a plurality of video files involves receiving the first video file and the second video file, collectively referred to as the video files. The video files may be uploaded by the user to a system for synchronizing a plurality of video files, downloaded from the internet, accessed by a unique resource locator (URL), retrieved from a storage media, and so on. The first video and the second video may be pre-processed with a conventionally known smoothing function to substantially reduce noise and other fine scale distortions present in the video files. In one implementation, the method involves selecting a first reference point as shot boundary from the first video file and a second reference point from the second video file, based in part on shot boundary detection. Shot boundary detection may be understood as the process of automatically detecting the boundaries between shots in a video. Generally a video comprises frames that are presented to the user's eye in rapid succession to create an impression of movement. A single frame usually consists of pixels and the data pertaining to pixels may be represented as binary data, such that the data may be processed using a computing device. Each frame may be uniquely identified by its frame index, which is a serial number assigned to the frame. A shot is a sequence of frames shot uninterruptedly by one camera.

There are several film transitions, usually used in film editing, to join adjacent shots and create various film transitions. In the context of shot boundary detection, the film transitions are usually group into two types. The first type is abrupt transitions where this is a sudden transition from one shot to another, i.e., for example, one frame belongs to the first shot, whereas the next frame belongs to the second shot. The second type of film transition is gradual transitions where the two shots are combined using at least one of a chromatic, spatial, and spatial-chromatic effects which gradually replace one shot by another.

In one implementation, the frames of each video may be analyzed based on contour matching of the successive frames. Further, the features of the successive frames may be extracted and matched in a log-polar domain to determine a change index, indicative of the difference between two frames. Other methods of determining change index include determining the Sum of absolute differences (SAD), wherein the two consecutive frames are compared pixel by pixel, and the summation of the absolute values of the differences of each two corresponding pixels is computed. The SAD is very sensitive to even minor changes within a scene, such as fast movements of the camera or zooming in and out, explosions, and change in luminance, resulting in high number of false hits. Another technique used for determining shot detection is determining histogram differences, wherein the difference between the histograms of two consecutive frames is computed. The histogram may be implemented as a table that contains, for each color within a frame, the number of pixels that are shaded in that color. One major drawbacks of histogram differences is that two images can have exactly the same histograms while the shown content may differ greatly. For example, a frame of the sea and a beach may have the same histogram as a frame of a barren field and the sky.

Another conventional technique used for shot boundary detection is Edge change ratio (ECR), which compares the actual content of two consecutive frames. The ECR technique involves transforming both the frames to edge pictures, by extracting the probable outlines of objects within the frames and comparing these edge pictures, using dilatation, to compute a probability that the second frame contains the same objects as the first frame. The ECR is very sensitive to hard cuts and usually detects a majority of soft cuts. In one implementation, a combination of two or more of the above techniques may be used in conjunction to improve the accuracy of shot boundary detection. Further, in one implementation, the feature extraction and matching of features of consecutive may be performed using normalized cross correlation so as to minimize the effects of change in camera position, zooming in and out, etc.

In one implementation, the method further involves transforming the image of the detected shot boundary into the log-polar domain and extracting the features of the first reference point and the second reference point. In said implementation, the extracted features of the first reference point and the second reference point are then compared in log-polar domain by normalized cross correlation, so as to determine a matching index indicative of the extent of match between the first reference point and the second reference point. The transformation of the data pertaining to the first reference point and the second reference point to a log-polar domain determines the extent of rotation and scaling between the first reference point and the second reference point as translation factor. The features are then extracted and matched using normalized cross correlation to compute the matching index. If the matching index is greater than a pre-defined matching threshold, the first reference point and the second reference point are designated to be the same and the user is notified that a synchronization point has been determined. In one implementation, the pre-defined matching threshold is an adaptive threshold, which may be based in part on the number of features determined in the two reference points, i.e., the first reference point and the second reference point.

The system and method for synchronizing a plurality of video files, as described in the present subject matter, enhance accuracy in synchronizing plurality of videos, even if the second video is a chopped version, time delayed version, geometrically transformed version of the first video. These and other features of the present subject matter would be described in greater detail in conjunction with the following figures. While aspects of described systems and methods for synchronizing a plurality of video files may be implemented in any number of different computing systems, environments, and/or configurations, the embodiments are described in the context of the following exemplary system(s).

FIG. 1 illustrates an exemplary network environment 100 implementing a video synchronization system 102, according to an embodiment of the present subject matter. In said embodiment, the network environment 100 includes the video synchronization system 102 configured to synchronize a plurality of video files. In one implementation, the video synchronization system 102 may be included within an existing information technology infrastructure system associated with an organization. The video synchronization system 102 may be implemented in a variety of computing systems, such as a laptop computer, a desktop computer, a notebook, a workstation, a mainframe computer, a server, and the like. It will be understood that the video synchronization system 102 may be accessed by various stakeholders, such as the administrators, the content creators, the copyrights or intellectual property (IP) enforcement personnels, and the video/data analysis team members, collectively referred to as the users and singularly as the user, using client devices 104 or applications residing on client devices 104. Examples of the client devices 104 include, but are not limited to, a portable computer 104-1, a mobile computing device 104-2, a handheld device 104-3, a workstation 104-N, etc. The client devices, 104-1, 104-2, 104-3, . . . 104-N, may also include a digital watermark detection system configured to compare two videos and detect the presence or absence of watermark. As shown in the figure, such client devices 104 are communicatively coupled to the video synchronization system 102 through a communication network 106 for facilitating one or more stakeholders to analyze a plurality of video files using the video synchronization system 102.

The communication network 106 may be a wireless network, wired network or a combination thereof. The communication network 106 can be implemented as one of the different types of networks, such as intranet, local area network (LAN), wide area network (WAN), the internet, and such. The communication network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 106 may include a variety of network devices, including routers, bridges, servers, computing devices, storage devices, etc.

In one implementation, the video synchronization system 102 includes a processor(s) 108 and a memory 110, communicatively coupled with the processor 108. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions stored in the memory 110.

The memory 110 can include any non-transitory computer-readable medium known in the art including, for example, volatile memory (e.g., RAM), and/or non-volatile memory (e.g., EPROM, flash memory, etc.). In one embodiment, the memory 110 includes module(s) 112 and data 114. The module(s) 112 further include a shot boundary detection module 116, a feature extraction module 118, a comparison and decision module 120, henceforth referred to as the CAD module 120, and other module(s) 122. It will be appreciated that such modules may be represented as a single module or a combination of different modules. Additionally, the memory 110 further includes data 114 that serves, amongst other things, as a repository for storing data fetched processed, received and generated by one or more of the module(s) 112. The data 114 includes, for example, video processing rules 124, video processing data 126, and other data 128. In one embodiment, the video processing rules 124, the video processing data 126, and other data 128, may be stored in the memory 110 in the form of data structures. Additionally, the aforementioned data can be organized using data models, such as relational or hierarchical data models.

In one embodiment, the video synchronization system 102 further includes one or more interface(s) 130. The interface(s) 130 may include a variety of software and hardware interfaces, for example, a web interface, a graphical user interface, etc., allowing the video synchronization system 102 to interact with the client devices 104. Further, the interface(s) 130 may enable the video synchronization system 102 to communicate with other computing devices, such as web servers and external data servers (not shown in figure). The interface(s) 130 can facilitate multiple communications within a wide variety of networks and protocol types, including wired networks, for example, LAN, cable, etc., and wireless networks, such as WLAN, cellular, or satellite. The interface(s) 130 may include one or more ports for connecting a number of devices to each other or to another server.

In operation, the shot boundary detection module 116 may be configured to receive a first video file and a second video file, collectively referred to as the video files. The video files may be uploaded by the user using the client devices 104, or may downloaded from the internet over the communication network 106, accessed by a unique resource locator (URL), retrieved from a storage media, and so on. In one implementation, the shot boundary detection module 116 may preprocess the first video and the second video with a conventionally known smoothing function so as to substantially reduce noise and other fine scale distortions present in the video files. The shot boundary detection module 116 further detects a shot boundary, i.e., a shot transition in the first video file as a first reference point as shot boundary. Similarly, the shot boundary detection module 116 detects a shot boundary as a second reference point from the second video file. As mentioned earlier, the techniques shot boundary detection involve automatically detecting the boundaries between shots in a video.

In one implementation, the shot boundary detection module 116 may be configured to analyze the frames of each video file based on contour matching of the successive frames. Further, the shot boundary detection module 116 may be configured to extract features of the successive frames to match the extracted features in a log-polar domain to determine a change index, indicative of the difference between two frames.

In another configuration, the shot boundary detection module 116 may be configured to implement other conventionally known techniques, such as Sum of absolute differences (SAD), histogram differences, and Edge change ratio (ECR), for shot boundary detection. In one implementation, the shot boundary detection module 116 may implement a combination of two or more of the above techniques in conjunction to improve the accuracy of shot boundary detection in the video files. Further, in one configuration, the shot boundary detection module 116 may be configured to transform the frames into log-polar domain, extract features of the frames, and match the extracted features of consecutive frames based on normalized cross correlation in the log-polar domain so as to minimize the effects of change in camera position, zooming in and out, etc.

In said implementation, the feature extraction module 118 may be configured to extract the features of the first reference point and the second reference point determined by the shot boundary detection module 116. The CAD module 120 may be configured to compare the extracted features of the first reference point and the second reference point in log-polar domain by normalized cross correlation, so as to determine a matching index indicative of the extent of match between the extracted features of the first reference point and the second reference point. The transformation of the data pertaining to the first reference point and the second reference point to a log-polar domain determines the extent of rotation and scaling between the first reference point and the second reference point. In one implementation, the CAD module 120 may be configured to compute a translation factor, indicative of the extent of rotation and scaling between the first reference point and the second reference point. In said translation, the features are usually represented by corners having high Eigen values as compared to the rest of the data. The features are then extracted and the CAD module 120 may be configured to match the extracted features using normalized cross correlation to compute the matching index. If the matching index is greater than a pre-defined matching threshold, the first reference point and the second reference point are designated to be the same point in the timeline of the video and the user is notified that a synchronization point has been determined. In one implementation, the pre-defined matching threshold is an adaptive threshold, which may be based in part on the number of features determined in the two reference points, i.e., the first reference point and the second reference point. If the matching index is less than a pre-defined matching threshold, the shot boundary detection module 116 may be configured to detect another shot boundary in either or both the video files, so as to determine the synchronization point.

Thus, the video synchronization system 102 facilitates accurate determination of synchronization in the video files. Further, the video synchronization system 102 facilitates substantially reducing the effects of chopping, time delaying, and geometrically transforming a copy of a video file with respect to the original copy of the video file. In one implementation, the video synchronization system 102 may further include a watermark detection module (not shown in figure) configured to detect watermark in the video files for various purposes, such as to trace the history of a copy of a video file, indicate the source of an unauthorized copy, and so on.

Figure 2:
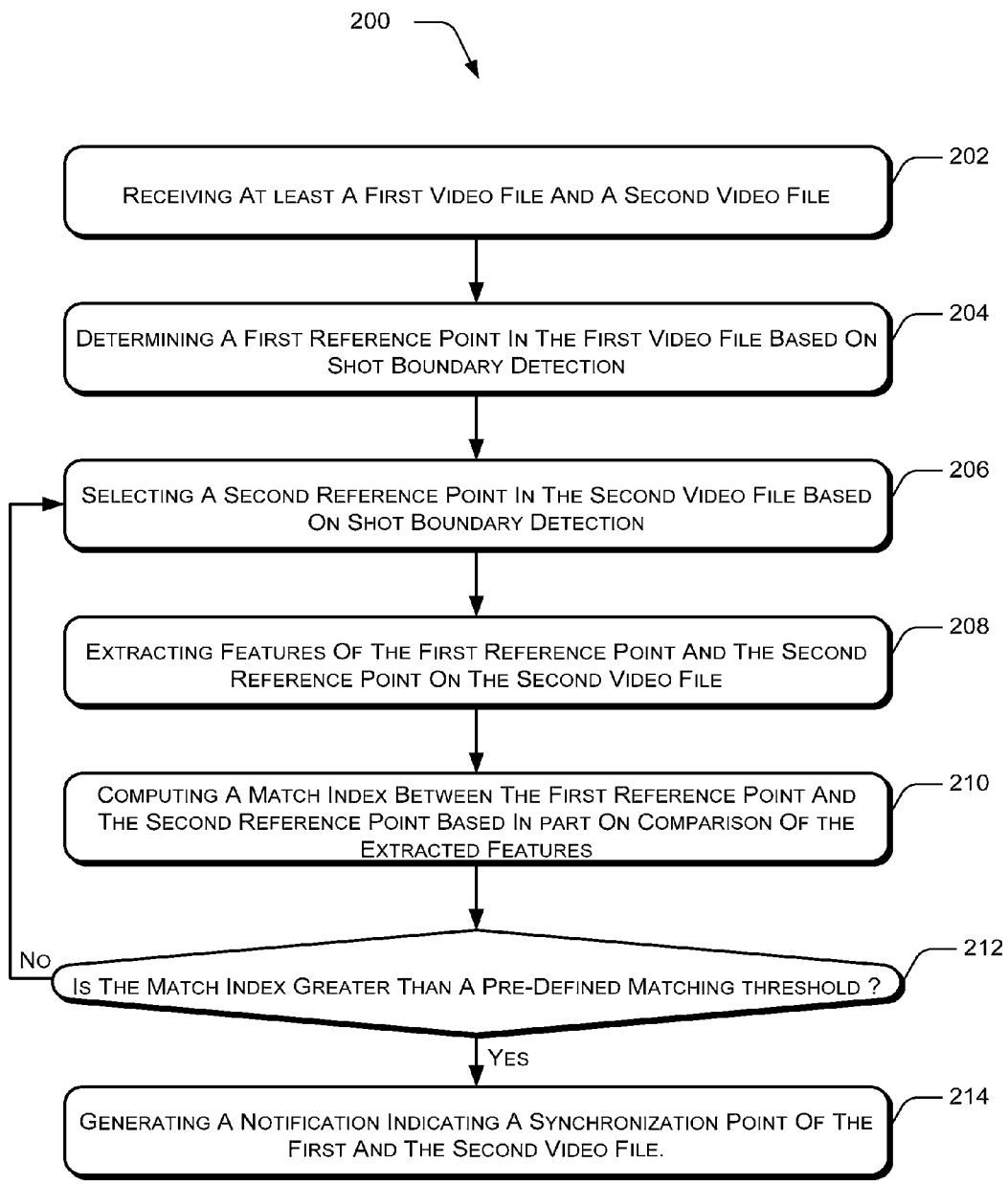
FIG. 2 illustrates a method for video synchronization, in accordance with an implementation of the present subject matter.

FIG. 2 illustrates a method 200 for synchronizing a plurality of video files, in accordance with an implementation of the present subject matter. The exemplary method may be described in the general context of computer executable instructions. Generally, computer executable instructions can include routines, programs, objects, components, data structures, procedures, modules, functions, and the like that perform particular functions or implement particular abstract data types. The method may also be practiced in a distributed computing environment where functions are performed by remote processing devices that are linked through a communication network. In a distributed computing environment, computer executable instructions may be located in both local and remote computer storage media, including memory storage devices.

The order in which the method is described is not intended to be construed as a limitation, and any number of the described method blocks can be combined in any order to implement the method, or alternate methods. Additionally, individual blocks may be deleted from the method without departing from the spirit and scope of the subject matter described herein. Furthermore, the method can be implemented in any suitable hardware, software, firmware, or combination thereof. The method described herein is with reference to video synchronization system 102; however, the method can be implemented in other similar systems albeit with a few variations as will be understood by a person skilled in the art.

At block 202, a first video file and a second video file, which are to be synchronized, is received. The video files may be uploaded by the user, downloaded from the internet, accessed by a unique resource locator (URL), retrieved from a storage media, and so on. In one implementation, the shot boundary detection module 116 of the video synchronization system 102 may be configured to receive the video files. Further, the shot boundary detection module 116 may be configured to pre-process the video files to substantially reduce noise and other fine scale distortions.

As illustrated in block 204, a first reference point in the first video file may be determined. In one implementation, a shot boundary in the first video file may be detected and deemed to be the first reference point. In said implementation, the shot boundary may be determined using any or a combination of conventionally known techniques, such as Sum of absolute differences (SAD), histogram differences, and Edge change ratio (ECR). In one embodiment, the shot boundary detection module 116 is configured to determine the first reference point.

As shown in block 206, a second reference point in the second video file may be determined. In one implementation, a shot boundary in the second video file may be detected and deemed to be the first reference point. In said implementation, the shout boundary may be determined using any or a combination of conventionally known techniques described earlier. In one embodiment, the shot boundary detection module 116 is configured to determine the second reference point.

As depicted in block 208, the features of the first reference point in the first video file and the second reference point in the second video file are extracted. In one implementation, the images depicting the reference points are converted to the log-polar domain, and then the features are extracted. The features may include the color layout, the edge histogram, the scalable color descriptor, the color moment data, a layout histogram, a texture histogram, an edge texture data, Blob data, corner detection data, metadata, color data, region data, temporal order data, audio data, motion data, time data, object recognition data, video sequence data, shot boundary data, shot clustering data, sub-sampled shot data, ordinal shot data, and so on. In one implementation, the feature extraction module 118 may be configured to extract the features of the first reference point and the second reference point.

At block 210, the extracted features are compared so as to determine a matching index indicative of the extent of match between the first reference point and the second reference point. In one implementation, the extracted features of the first reference point and the second reference point and are compared in the log-polar domain by normalized cross correlation. In said translation, the features are usually represented by corners having high Eigen values as compared to the rest of the data. The features are then compared to determine a matching index, indicative of the extent of match between the features of the first reference point and the second reference point. In one implementation, the CAD module 120 is configured to compare the features and compute the matching index.

As shown in block 212, it is determined if the matching index is greater than pre-defined matching threshold. The pre-defined matching threshold may be an absolute threshold or may be an adaptive threshold, which may be based in part on the number of features determined in the two reference points, i.e., the first reference point and the second reference point. In one implementation, the CAD module 120 may be configured to compare matching index with the pre-defined matching threshold.

If at block 212, it is determined that the matching index is greater than the pre-defined matching threshold (yes-branch), then as illustrated in block 214, a notification is generated that a synchronization point has been found. In one implementation, the CAD module 120 may be configured to generate the notification.

If at block 212, it is determined that the matching index is less than the pre-defined matching threshold (no-branch), then a new shot boundary is selected as the second reference point in the second video file, as shown in block 206, and the steps depicted by blocks 208, 210, and 212 are repeated till a synchronization point is found.

Although implementations for synchronizing a plurality of video files have been described in language specific to structural features and/or methods, it is to be understood that the present subject matter is not necessarily limited to the specific features or methods described. Rather, the specific features and methods are disclosed as implementations for synchronizing a plurality of video files.

I claim:

1. A method for synchronizing a first video file and a second video file, the method comprising:
   detecting at least one shot boundary in each of the first video file and the second video file;
   selecting a shot boundary, from the at least one detected shot boundary in the first video file, as a first reference point;
   selecting a shot boundary, from the at least one detected shot boundary in the second video file, as a second reference point;
   transforming images depicting the first reference point and the second reference point into a log-polar domain;
   extracting a plurality of features associated with the first reference point and the second reference point;
   comparing each of the plurality of features extracted from the first reference point to the corresponding each of the plurality of features extracted from the second reference point in the log-polar domain based in part on normalized cross correlation;
   computing a matching index, indicative of the extent of match between the extracted features of the first reference point and the second reference point, based on the comparison; and
   generating a notification indicating the synchronization of the first video file and the second video file if the matching index is determined to be greater than a pre-defined matching threshold, wherein the pre-defined matching threshold is an adaptive threshold based in part on the number of extracted features.

2. The method as claimed in claim 1, wherein the method further comprises pre-processing at least one of the first video file and the second video file to substantially reduce at least one of noise and fine scale distortions.

3. The method as claimed in claim 1, wherein the features comprise at least one of a color layout, an edge histogram, a scalable color descriptor, color moment data, a layout histogram, a texture histogram, an edge texture data, Blob data, corner detection data, metadata, color data, region data, temporal order data, audio data, motion data, time data, object recognition data, video sequence data, shot boundary data, shot clustering data, sub-sampled shot data, and ordinal shot data.

4. The method as claimed in claim 1, wherein the method further comprises detecting a watermark in at least one of the first video file and the second video file, based in part on the synchronization.

5. A video synchronization system, configured for synchronizing a first video file and a second video file, the video synchronization system comprising:
   a processor; and
   a memory coupled to the processor, the memory comprising,
      a shot boundary detection module configured to:
         detect at least one shot boundary in each of the first video file and the second video file;

select a shot boundary, from the at least one detected shot boundary in the first video file, as a first reference point;
select a shot boundary, from at least one detected shot boundary in the second video file, as a second reference point;
a feature extraction module configured to:
transform images depicting the first reference point and the second reference point into a log-polar domain;
extract a plurality of features associated with the first reference point and the second reference point;
a comparison and decision (CAD) module configured to:
compare each of the plurality of features extracted from the first reference point to the corresponding each of the plurality of features extracted from the second reference point in the log-polar domain based in part on normalized cross correlation;
compute a matching index, indicative of the extent of match between the extracted features of the first reference point and the second reference point, based on the comparison; and
generate a notification indicating the synchronization of the first video file and the second video file if the matching index is determined to be greater than a pre-defined matching threshold, wherein the pre-defined matching threshold is an adaptive threshold based in part on the number of extracted features.

6. The video synchronization system as claimed in claim 5, wherein the shot boundary detection module is further configured to pre-process at least one of the first video file and the second video file to substantially reduce at least one of noise and fine scale distortions.

7. The video synchronization system as claimed in claim 5, wherein the video synchronization system further comprises a watermark detection module configured to detect watermark present in at least one of the first video file and the second video file, based in part on the synchronization.

8. The video synchronization system as claimed in claim 5, wherein the video synchronization system is further communicatively coupled to a digital watermark detection system.

9. A non-transitory computer-readable medium having embodied thereon a computer program for executing a method comprising:
detecting at least one shot boundary in each of a first video file and a second video file;
selecting a shot boundary, from the at least one detected shot boundary in the first video file, as a first reference point;
selecting a shot boundary, from the at least one detected shot boundary in the second video file, as a second reference point;
transforming images depicting the first reference point and the second reference point into a log-polar domain;
extracting a plurality of features associated with the first reference point and the second reference point;
comparing each of the plurality of features extracted from the first reference point to the corresponding each of the plurality of features extracted from the second reference point in the log-polar domain based in part on a normalized cross correlation;
computing a matching index, indicative of the extent of match between the extracted features of the first reference point and the second reference point, based on the comparison; and
generating a notification indicating the synchronization of the first video file and the second video file if the matching index is determined to be greater than a pre-defined matching threshold, wherein the pre-defined matching threshold is an adaptive threshold based in part on the number of extracted features.

10. The video synchronization system as claimed in claim 5, wherein the features comprise at least one of a color layout, an edge histogram, a scalable color descriptor, color moment data, a layout histogram, a texture histogram, an edge texture data, Blob data, corner detection data, metadata, color data, region data, temporal order data, audio data, motion data, time data, object recognition data, video sequence data, shot boundary data, shot clustering data, sub-sampled shot data, and ordinal shot data.

\* \* \* \* \*